US005139870A

United States Patent [19]

Koike et al.

[11] Patent Number: 5,139,870

[45] Date of Patent: Aug. 18, 1992

[54] PHOTOGRAPHIC SUPPORT

[75] Inventors: Kazuyuki Koike; Tetsuro Fuchizawa, both of Shizuoka; Keisuke Shiba, Kanagawa, all of Japan

[73] Assignee: Fuji Photo Film Co., Ltd., Kanagawa, Japan

[21] Appl. No.: 271,251

[22] Filed: Nov. 15, 1988

[30] Foreign Application Priority Data

Nov. 18, 1987 [JP] Japan ................................ 62-291486

[51] Int. Cl.[5] ........................ B32B 15/08; B32B 27/30

[52] U.S. Cl. .................................... 428/344; 428/355; 428/463; 428/522

[58] Field of Search ............... 428/344, 355, 463, 521, 428/522; 430/537; 526/271

[56] References Cited

U.S. PATENT DOCUMENTS

| | | | |
|---|---|---|---|
| 2,299,433 | 10/1942 | Stoner | 526/271 |
| 2,329,456 | 9/1943 | Campbell | 526/271 |
| 3,539,476 | 11/1970 | Dolce | 430/537 |
| 3,711,284 | 1/1973 | van Paesschen | 430/537 |
| 3,836,510 | 9/1974 | Takahashi | 526/271 |
| 4,171,975 | 10/1979 | Kato | 430/554 |
| 4,254,208 | 3/1981 | Tatsuta | 430/537 |

*Primary Examiner*—Jenna L. Davis
*Attorney, Agent, or Firm*—Sughrue, Mion, Zinn Macpeak & Seas

[57] ABSTRACT

A photographic support is disclosed, comprising a metal surface having mirror reflectivity or secondary diffuse reflectivity and an adhesive layer provided on the metal surface, wherein the adhesive layer comprises a copolymer containing vinylidene chloride, vinyl chloride, vinyl acetate and maleic anhydride.

2 Claims, No Drawings

PHOTOGRAPHIC SUPPORT

FIELD OF THE INVENTION

The present invention relates to a photographic support providing excellent images. More particularly, it is concerned with a photographic support which is free from problems such as peeling of a silver halide light-sensitive layer during development, fog, and spot, is good in reproducibility of hue, gradation and so forth, and further which provides images having excellent sharpness.

BACKGROUND OF THE INVENTION

As compared with conventionally known supports, e.g., transparent plates or films of TAC, PET, polycarbonate and the like, paper, synthetic paper, baryta paper, films or plates containing white pigment, and metallic plates such as an aluminum plate having the surface of which is subjected to anodization, a photographic support having a metal reflective or secondary diffuse reflective surface permits production of photographs or recording media which are excellent in reproducibility of gradation or reproducibility of hue in the case of color photographs, sharpness of image, and so forth. Such supports are described in JP-A-61-210346, JP-A-63-24247, JP-A-63-24251, JP-A-63-24252, JP-A-63-24253 and JP-A-63-24255 (the term "JP-A" as used herein means an "unexamined published Japanese patent application), Japanese Patent Application Nos. 61-168800 and 61-249873.

To impart mirror reflective property or secondary diffuse property, inorganic substances such as natural mica, fish scales, pearl, and the like can be used. In many cases, metals such as aluminum, silver, gold, copper, chromium, nickel, platinum, and the like, or their alloys are used. In general, aluminum is preferably used.

The term "mirror reflectivity" herein indicates a reflection on a smooth surface in accordance with the regular reflection law.

The term "secondary diffuse-reflectivity" herein indicates a reflection occurring on a smooth mirror surface but on which very small unevennesses are provided to form boundaries thereon.

Details of the reflection on the surface of substances are described in *Shikisai Kagaku Handbook*, 5th edition, chapter 18, edited by Nippon Shikisai Gakkai and published by Tokyo Daigaku Shuppan-kai in 1985.

When, however, metals baser than silver are used for the support in a photographic or recording light-sensitive material using a silver halide photographic graphic emulsion, fog or spots tend to be readily formed during the developing process. It is known that a thermoplastic resin adhesive layer can be provided in order to overcome the above problem. In this case, however, the adhesive layer is readily peeled apart during the developing process or the drying process after the development. Furthermore, when a thermoplastic resin is used, it is difficult to form a thin adhesive layer, e.g., a layer having a thickness of 0.1 to 5 μm.

Moreover, with a lapse of a long term after the development, mirror or secondary diffuse-reflective property may be reduced, or ununiformness in reflectivity may be formed.

SUMMARY OF THE INVENTION

An object of the present invention is to provide a photographic support which is free from problems such as peeling (delamination) of a light-sensitive material layer during development, or before or after development.

Another object of the present invention is to provide a photographic support which provides images having excellent storage stability.

The present invention provides a photographic support comprising a metal surface having mirror reflectivity or secondary diffuse reflectivity and an adhesive layer provided on the metal surface, wherein the adhesive layer comprises a copolymer containing (a) vinylidene chloride, (b) vinyl chloride, (c) vinyl acetate and (d) maleic anhydride. Particularly, it is preferred that the adhesive layer comprises a copolymer containing (a) 5 to 60% by weight of vinylidene chloride, (b) 20 to 75% by weight of vinyl chloride, (c) 5 to 15% by weight of vinyl acetate and (d) 0.1 to 5% by weight of maleic anhydride.

DETAILED DESCRIPTION OF THE INVENTION

In the copolymer to be used in the present invention, if the proportion of vinylidene chloride is less than 5% by weight, hydrophobicity is reduced and the film strength of the adhesive layer at the time of wetting is undesirably decreased.

If the proportion of vinyl chloride is less than 20% by weight or more than 75% by weight, solubility in organic solvents is decreased.

If the proportion of vinyl acetate is more than 15% by weight, blocking between the adhesive layer and the back of the support readily occurs. On the other hand, if it is less than 5% by weight, the adhesive layer is undesirably colored with a developer.

If the proportion of maleic anhydride is less than 0.1% by weight, the adhesion between the adhesive layer and the silver halide emulsion layer is undesirably weakened.

In order to increase the adhesion between the adhesive layer and the silver halide emulsion layer, it is effective to apply pretreatment such as corona discharging, glow discharging, flame treatment and so forth after coating and drying the adhesive layer.

Further, a subbing layer of gelatin may be provided on the adhesive layer before coating the silver halide emulsion thereon. The coating amount of the gelatin layer is preferably 0.05 to 1 $g/m^2$.

It is preferred that the adhesive layer of the present invention is uniformly coated in a low thickness such as from 0.1 to 10 μm on the metal surface of the support, the metal surface being present on a substrate.

If the thickness of the adhesive layer is less than 0.1 μm, adhesion between the metal reflective layer and the silver halide light-sensitive layer is poor. On the other hand, if it is more than 10 μm, production costs are increased undesirably from an economic standpoint and further, reproducibility such as hue, gradation and so forth is reduced.

As dilution solvents for the adhesive of the present invention, ketones such as methyl ethyl ketone (MEK), acetone and the like, chlorinated solvents such as trichlorene and the like, esters such as ethyl acetate, butyl acetate and the like, and aromatic solvents such as toluol and the like can be used. Particularly preferred is ethyl acetate.

The adhesive layer of the present invention can be coated by the methods described in JP-A-51-114120, JP-A-54-94025, and JP-A-49-11118, although the present invention is different from the above methods in that the adhesive layer is provided on the top surface of the metal thin layer having mirror reflectivity or secondary diffuse-reflectivity. More specifically, the adhesive layer can be coated by techniques such as dip coating, air knife coating, curtain coating, roller coating, doctor coating, wire bar coating, slide coating, gravure coating, reverse coating, and so forth.

The support having a mirror reflective or secondary diffuse reflective surface can be obtained by providing a thin layer of a material which when the surface is sufficiently smooth, provides a mirror reflector, on the base member for the support. For example, the methods described in, for example, JP-A-61-210346, JP-A-63-24247, Japanese Patent Application Nos. 61-168800 and 61-249873 can be employed.

Metals which are preferably used include the metals described in F. Benford et al., *J. Opt. Soc. Amer.*, Vo. 32, pp. 174–184 (1942), e.g., silver, aluminum, gold, copper, chromium, nickel, platinum and the like, and their alloys such as an aluminum/magnesium alloy, brass and the like. In addition, a layer filled with a powder of the above metal, a powder of natural mica or fish scales providing mirror reflectivity among inorganic substances, and the like can be used.

As a substrate for the support of the present invention, those heretofore used for supports, e.g., plastic films, paper, RC-paper, synthetic paper, metal plates and the like, and plates of polymers or copolymers having excellent dimensional stability, such as polycarbonate, polystyrene, polyacrylate, polymethacrylate, PET and the like can be used. Of these substrates, paper and RC paper are particularly preferred. The support according to the present invention can be obtained easily and at a reduced cost by using a low density polyethylene together with the polyethylene layer of RC paper and laminating thereto a previously prepared aluminum foil. In disc-like recording media as described in Japanese Patent Application No. 61-249873, polycarbonate, polystyrene, a polyimide resin, and ceramics which are excellent particularly in dimensional stability and physical strength are used.

The support of the present invention can be widely used as a photographic reflective support. It is also possible that a silver halide emulsion layer for black-and-white printing paper is provided on the support of the present invention, and a protective layer is provided on the emulsion layer. Similarly, a color printing paper light-sensitive material can be produced by providing two or more light-sensitive silver halide emulsion layers for the usual color printing paper, having varied spectral sensitivities and containing varied color couplers on the support of the present invention. A color reversal light-sensitive material, a direct positive type color printing paper, and a direct positive type color copy material using the light fogging method can be produced. A print light-sensitive material of the silver dye bleach (SDB) system can be produced by providing red-sensitive, green-sensitive and blue-sensitive silver halide emulsion layers containing silver halide grains having varied spectral sensitivities and dyes to be used in the SDB method on the support of the present invention. The support of the present invention can be used in production of reflection type disc plates or disc films and recording materials using silver halide. More specifically, the support of the present invention can be used in production of light-sensitive materials described in, for example, JP-A-63-24251, JP-A-63-24252, JP-A-63-24253, JP-A-63-24255, Japanese Patent Application Nos. 61-249873, 61-259794, and 61-275572.

A light-sensitive material in which a color image can be formed by diffusing a color removal dye and then transferring can be produced by providing a mordanting layer on the support of the present invention. Such a material in which a silver diffusion-transfer type silver image is formed can be produced by providing a center of physical development in a subbing layer on the support of the present invention. An adsorption layer (ADL) of development inhibiting or desilvering action-inhibiting substances as described in, for example, JP-B-59-3737 (the term "JP-B" as used herein means an "examined Japanese patent publication") and JP-A-50-65230, e.g., iodobromine ion, bromine ion, heterocyclic compounds containing a mercapto group, and heterocyclic compounds capable of forming imino silver can be provided on the support of the present invention.

The support of the present invention can be applied to heat-developable light-sensitive materials and/or dye fixing materials (image-receiving materials), as described in, for example, U.S. Pat. No. 4,500,626, JP-A-60-133449, 59-218443, and JP-A-61-238056.

By providing the adhesive layer as described above on a metal surface having mirror reflectivity or secondary diffuse-reflectivity, there can be obtained a photographic support which is free from problems such as peeling of a silver halide emulsion layer during development, fog and spots, and which provides images having good reproducibility in hue, gradation and so forth, and excellent sharpness.

EXAMPLES

The present invention is described in greater detail with reference to the following examples although it is not intended to be limited thereto.

Unless otherwise indicated, all percents, ratios, parts, etc., are by weight.

EXAMPLES 1 TO 3, AND COMPARATIVE EXAMPLES 1 AND 2

Five reflective photographic supports were prepared as follows.

Metal aluminum was subjected to coarse rolling. Then two metal aluminum sheets were rolled in lamination successively between two above and below adjacent rolling rollers to obtain an aluminum foil of about 10 μm thickness which was then annealed. This aluminum foil had a secondary diffuse-reflective surface.

An adhesive having the composition shown in Table 1 was diluted with ethyl acetate and coated on the secondary diffuse-reflective surface of the 10 μm thick soft aluminum in a dry amount of 5 $g/m^2$, and dried at 100° C. for 2 minutes in an oven.

COMPARATIVE EXAMPLE 3

A sixth support for a color photographic printing paper was produced in the same manner as in Examples 1 to 3 except that gelatin instead of an adhesive was coated on the aluminum foil in an amount of 0.3 $g/m^2$.

TABLE 1

| | Example 1 (wt %) | Example 2 (wt %) | Example 3 (wt %) | Comparative Example 1 (wt %) | Comparative Example 2 (wt %) |
|---|---|---|---|---|---|
| Vinylidene chloride | 40 | 30 | 20 | 70 | 30 |
| Vinyl chloride | 50 | 55 | 70 | 10 | 60 |
| Vinyl acetate | 9 | 11 | 9 | 20 | 10 |
| Maleic anhydride | 1 | 4 | 1 | — | — |

The six supports prepared in Example 1-3 and Comparative Examples 1-3 were then treated as follows.

On the side of the aluminum foil opposite the side having the adhesive layer (or gelatin), butyl titanate was coated in an amount of 0.1 g/$m^2$.

The butyl titanate-coated surface of the aluminum foil and a substrate paper having a base weight of 150 g/$m^2$ were bonded together with low density polyethylene melted at 300° C. On the opposite side of the substrate paper, high density polyethylene was melt laminated.

A silver halide emulsion prepared according to Example 4 of JP-A-63-24247 was coated on the adhesive layer or gelatin layer of the above prepared supports to obtain a color photographic printing paper.

Silver halide emulsion (1) to be used in the present invention was prepared as follows.

| | |
|---|---|
| Solution (1) | |
| $H_2O$ | 1,000 cc |
| NaCl | 5.5 g |
| Gelatin | 32 g |
| Solution (2) | |
| Sulfuric acid (1N) | 24 cc |
| Solution (3) | |
| Silver halide solvent (1%) having the following formula: | |
| 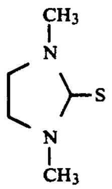 | 3 cc |
| Solution (4) | |
| KBr | 15.66 g |
| NaCl | 3.30 g |
| Water to make | 200 cc |
| Solution (5) | |
| $AgNO_3$ | 32 g |
| Water to make | 200 cc |
| Solution (6) | |
| KBr | 62.72 g |
| NaCl | 13.22 g |
| $H_2IrCl_6$ (0.001%) | 4.54 cc |
| Water to make | 600 cc |
| Solution (7) | |
| $AgNo_3$ | 128 g |
| Water to make | 600 cc |

Solution (1) was heated to 56° C., and solutions (2) and (3) were added to solution (1). Then solutions (4) and (5) were added at the same time over 30 minutes. After 10 minutes, solutions (6) and (7) were added at the same time over 20 minutes. Five minutes after the addition, the temperature was lowered to perform desilvering. Water and dispersed gelatin were added and the pH was adjusted to 6.2 to obtain a monodispersed cubic silver bromide salt emulsion having a mean grain size of 0.45 μm, a coefficient of variation (s/d; s=standard deviation; d=mean grain size) of 0.08, and silver bromide of 70 mol%. The emulsion thus prepared was chemically sensitized by adding sodium thiosulfate thereto.

Silver halide emulsions (2), (3) and (4) having varied silver chloride contents were prepared in the same manner as above except that the amounts of KBr and NaCl in solutions (4) and (6), and the addition times of solutions (4) and (5) were changed as shown in Table 2.

TABLE 2

| Emulsion | Solution (4) KBr (g) | Solution (4) NaCl (g) | Solution (6) KBr (g) | Solution (6) NaCl (g) | Addition Time of Solutions (4) and (5) (min) |
|---|---|---|---|---|---|
| (2) | 6.71 | 7.70 | 26.88 | 30.84 | 12 |
| (3) | 3.36 | 9.35 | 13.44 | 37.44 | 10 |
| (4) | 0.22 | 10.89 | 0.90 | 43.61 | 8 |

The mean grain size, the coefficient of variation, and the halogen composition of each of the silver halide emulsions (1) to (4) are shown in Table 3.

TABLE 3

| Emulsion | Mean Grain Size (μm) | Coefficient of Variation (s/d) | Halogen Composition Br (%) | Halogen Composition Cl (%) |
|---|---|---|---|---|
| (1) | 0.45 | 0.08 | 70 | 30 |
| (2) | 0.45 | 0.07 | 30 | 70 |
| (3) | 0.45 | 0.07 | 15 | 85 |
| (4) | 0.45 | 0.08 | 1 | 99 |

The first layer to the seventh layer shown in Table 4 were provided on each support to obtain a color light-sensitive material.

First Layer

Silver halide emulsion (4) was subjected to spectral sensitization by adding blue-sensitive sensitizing dye (a) in an amount of $7.0\times10^{-4}$ mol per mol of Ag. Yellow Coupler (d) and Color Image Stabilizer (e) were dissolved and dispersed in Solvent (f), and added in a predetermined amount. The resulting mixture was coated to form the first layer.

Third Layer

Silver halide emulsion (3) was subjected to spectral sensitization by adding Green-Sensitive Sensitizing Dye (b) in an amount of $4.0\times10^{-4}$ mol per mol of Ag. Magenta Coupler (h) and Color Image Stabilizer (i) were dissolved and dispersed in Solvent (j), and added in a predetermined amount. The resulting mixture was coated to form the third layer.

Fifth Layer

Silver halide emulsion (2) was subjected to spectral sensitization by adding Red-Sensitive Sensitizing Dye (c) in an amount of $1.0\times10^{-4}$ mol per mol of Ag. Cyan Coupler (n) and Color Image Stabilizer (o) were dissolved and dispersed in Solvent (f), and added in a predetermined amount. The resulting mixture was coated to form the fifth layer.

For the second, fourth, sixth and seventh layers, the coating solutions were prepared in the same manner as above.

On the adhesive layer or the gelatin layer of the supports were coated the first layer to the seventh layer in the predetermined amounts shown in Table 4 by the usual method to obtain Sample Nos. 1 to 3 and Comparative Sample Nos. 1 to 3 (see Table 5).

Each sample was subjected to gradation exposure for sensitometry through a three-color analytical filter of blue, green and red using a 2,840° K. light source, or to image exposure for extending prints through a negative film.

Color development, bleach-fixation, and rinsing were carried out to obtain a photographic image.

| | | | |
|---|---|---|---|
| Development | Formulation A | 35° C. | 45 seconds |
| Bleach-Fixation | Formulation A | 35° C. | 45 seconds |
| Rising | Formulation A | 28-35° C. | 90 seconds |

Color Developer A

| | |
|---|---|
| Water | 800 cc |
| Diethylenetriamine pentaacetate | 1.0 g |
| Sodium sulfite | 0.2 g |
| N,N-diethylhydroxylamine | 4.2 g |
| Potassium bromide | 0.6 g |

-continued

| | |
|---|---|
| Sodium chloride | 1.5 g |
| Triethanolamine | 8.0 g |
| Potassium carbonate | 30 g |
| N-ethyl-N (β-methanesulfonamidoethylamino)-3-methyl-4-aminoaniline sulfate | 4.5 g |
| 4,4'-Diaminostylbene-based fluorecent brightening agent (Whitex 4 produced by Sumitomo Kagaku Co., Ltd.) | 2.0 g |
| Water to make | 1,000 cc |

The pH was adjusted to 10.25 by adding KOH.

Formulation A of Fixing Solution for Bleaching

| | |
|---|---|
| Ammonium thiosulfate (54 wt %) | 150 ml |
| $Na_2SO_3$ | 15 g |
| $NH_4[Fe(III)(EDTA)]$ | 55 g |
| EDTA.2Na | 4 g |
| Glacial acetic acid | 8.61 g |
| Water to make | 1,000 ml |
| | (pH 5.4) |

Formulation A of Rinsing Solution

| | |
|---|---|
| $EDTA.2Na.2H_2O$ | 0.4 g |
| Water to make | 1,000 ml |
| | (pH 5.4) |

By observing the photographic image with the naked eyes, it was found that the colors of magenta and yellow images were excellent, and sharpness was astonishingly improved. In the comparative sample, film peeling occurred and the image could not be observed.

TABLE 4

| Layer | Main Composition | Amount |
|---|---|---|
| 7th Layer (protective layer) | Gelatin | 1.33 $g/m^2$ |
| | Acryl modified copolymer of polyvinyl alcohol (degree of modification: 17%) | 0.17 $g/m^2$ |
| 6th Layer (Ultraviolet ray absorbing layer) | Gelatin | 0.54 $g/m^2$ |
| | Ultraviolet ray absorber (k) | 0.21 $g/m^2$ |
| | Solvent (m) | 0.09 $cc/m^2$ |
| 5th Layer (red sensitive layer) | Silver halide emulsion (2) (as silver) | 0.22 $g/m^2$ |
| | Gelatin | 0.90 $g/m^2$ |
| | Cyan coupler (n) | 0.36 $g/m^2$ |
| | Color image stabilizer (o) | 0.17 $g/m^2$ |
| | Solvent (f) | 0.22 $cc/m^2$ |
| | Red-sensitive sensitizing dye (c) | |
| 4th Layer (Ultraviolet ray absorbing layer) | Gelatin | 1.60 $g/m^2$ |
| | Ultraviolet ray absorber (k) | 0.62 $g/m^2$ |
| | color mixing-inhibitor (l) | 0.05 $g/m^2$ |
| | Solvent (m) | 0.26 $cc/m^2$ |
| 3rd Layer (green-sensitive layer) | Silver halide emulsion (3) (as silver) | 0.15 $g/m^2$ |
| | Gelatin | 1.80 $g/m^2$ |
| | Magenta coupler (h) | 0.38 $g/m^2$ |
| | Color image stabilizer (i) | 0.16 $g/m^2$ |
| | Solvent (j) | 0.38 $cc/m^2$ |
| | Green-sensitive sensitizing dye (b) | |
| 2nd Layer (mixing inhibiting layer) | Gelatin | 0.99 $g/m^2$ |
| | Color mixing inhibitor (g) | 0.08 $g/m^2$ |
| 1st Layer (blue sensitive layer) | Silver halide emulsion (4) (as silver) | 0.26 $g/m^2$ |
| | Gelatin | 1.83 $g/m^2$ |
| | Yellow coupler (d) | 0.91 $g/m^2$ |
| | Color image stabilizer (e) | 0.19 $g/m^2$ |
| | Solvent (f) | 0.36 $cc/m^2$ |
| | Blue-sensitive sensitizing dye (a) | |

(a) Blue-sensitive sensitizing dye

TABLE 4-continued
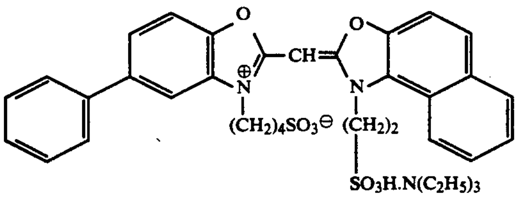
(b) Green-sensitive sensitizing dye
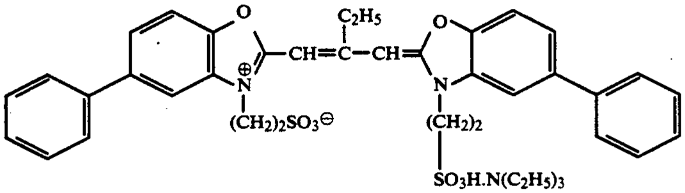
(c) Red-sensitive sensitizing dye
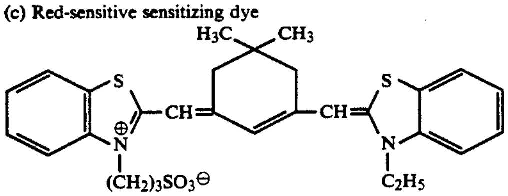
(d) Yellow coupler
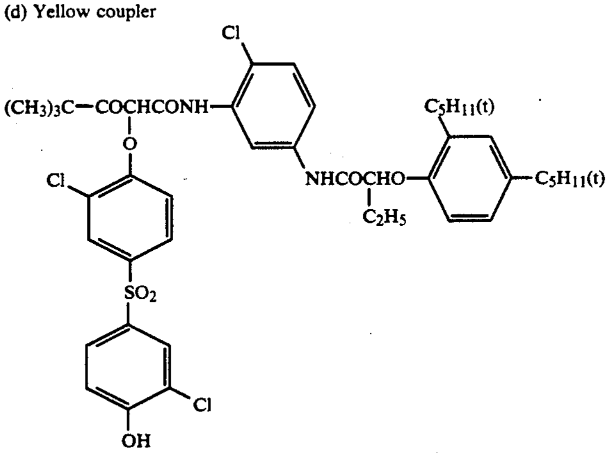
(e) Color image stabilizer
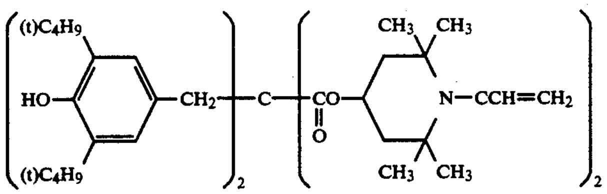
(f) Solvent
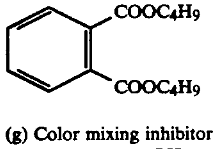
(g) Color mixing inhibitor
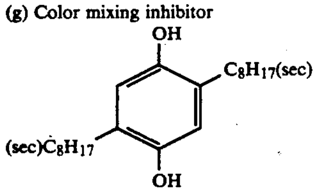

TABLE 4-continued
(h) Magenta coupler
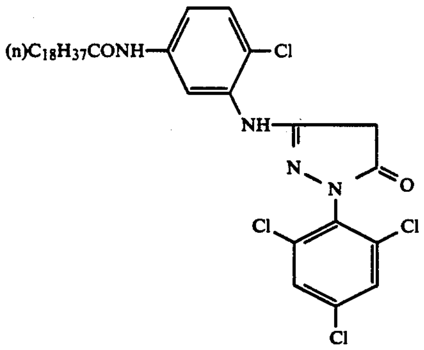
(i) Color image stabilizer
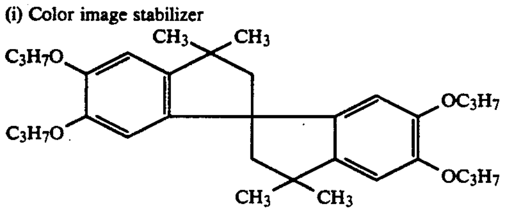
(j) Solvent
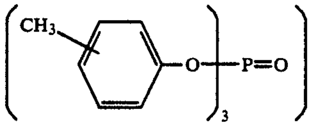
(k) Ultraviolet ray absorber
Mixture (1:5:3 molar ratio) of
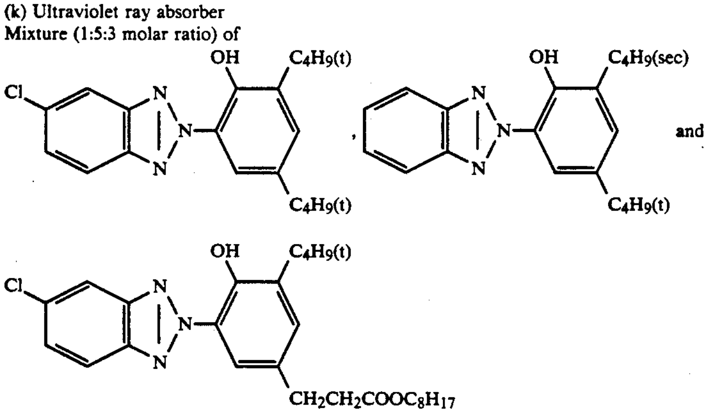
(l) Color mixing inhibitor
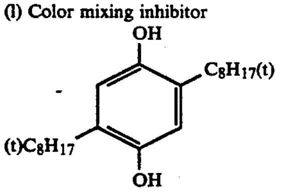
(m) Solvent
(iso$C_9H_{18}O)_3$P=O
(n) Cyan coupler
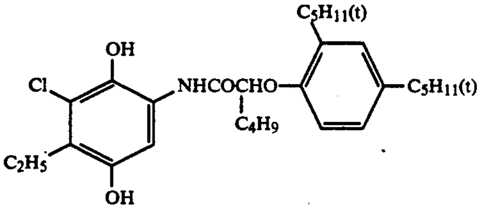

TABLE 4-continued (o) Color Image stabilizer
Mixture (1:3:3 molar ratio) of

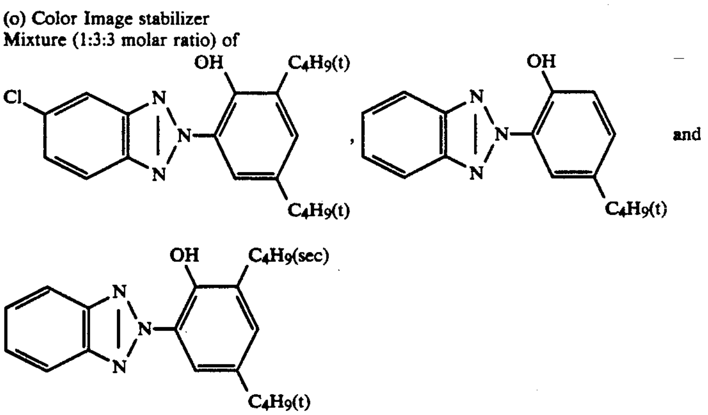

The photographic printing paper as obtained above was evaluated by the following testing methods.

(1) Adhesion Test at the Time of Drying Before Processing

A polyester adhesive tape (Nitto Mylar Tape No. 31) was bonded to the emulsion surface after drying the photographic emulsion and peeled apart instantly.

(2) Adhesion Test at the Time of Wetting in Processing

Scratches were formed with a pencil in the emulsion surface of the sample after development, fixation and rinsing, in a checked pattern form in the wet state, and then rubbed ten times with rubber under a load of 3 kg.

(3) Adhesion Test at the Time of Drying after Processing

Scratches were formed with a pencil in the emulsion surface of the sample after development, fixation, rinsing and drying, in a checked pattern form. Nitto Mylar Tape No. 31 was bonded thereto and was allowed to stand for 24 hours under conditions of 25° C. and 55% RH, and then peeled apart instantly.

The rating was as follows:

A: In the tests (1), (2) and (3), the emulsion layer was not peeled apart at all.

B: The emulsion layer was somewhat peeled apart.

C: The emulsion layer was somewhat peeled apart, but to an extent that is still allowable for practical use.

D: The emulsion layer was peeled apart to the extent that is unsuitable for practical use.

The results of the adhesion tests are shown in Table 5.

TABLE 5

| | Example | | | Comparative Example | | |
|---|---|---|---|---|---|---|
| Processing | 1 | 2 | 3 | 1 | 2 | 3 |
| At drying before processing | A | A | A | D | C | D |
| At wetting in processing | A | A | A | C | D | D |
| At drying after processing | A | A | A | D | C | D |

It can be seen from the results in Table 5 that the adhesion of the silver halide emulsion layer is increased by providing the adhesive layer of the present invention.

EXAMPLES 4 TO 6

Aluminum was vacuum deposited on a polycarbonate sheet (thickness 170 μm) at $10^{-5}$ Torr. The thickness of the deposited film was about 1,000 Å.

The surface was mirror reflective. The adhesive layers of Examples 1, 2 and 3 were dried at 150° C. for 3 minutes in an oven in a dry amount of 0.5 g/m$^2$ (Examples 4, 5 and 6). Subsequently, corona discharging was applied, and gelatin was coated and dried to obtain a subbing layer. The thickness of the subbing layer was about 0.1 μm.

A silver halide emulsion layer and a protective layer were provided by coating on ultrafine hard tone silver iodobromide-gelatin emulsion according to JP-A-63-104234 to obtain an optical disc recording plate.

While the invention has been described in detail and with reference to specific embodiments thereof, it will be apparent to one skilled in the art that various changes and modifications can be made therein without departing from the spirit and scope thereof.

What is claimed is:

1. A photographic support comprising a metal surface having mirror reflectivity or secondary diffuse-reflectivity and an adhesive layer provided on the metal surface, wherein said adhesive layer comprises a copolymer containing (a) 5 to 60% by weight of vinylidene chloride (b) 20 to 75% by weight of vinyl chloride (c) 5 to 15% by weight of vinyl acetate and (d) 0.1 to 5% by weight of maleic anhydride.

2. A photographic support as claimed in claim 1, wherein the adhesive layer is present in a thickness of from 0.1 to 10 μm.

* * * * *